United States Patent
Schafer

[11] 3,894,725
[45] July 15, 1975

[54] TRANSMISSION FOR TWIN WORM EXTRUDERS

[75] Inventor: Heinrich Schafer, Vellmar, Germany

[73] Assignee: Rheinstahl Aktiengesellschaft, Essen, Germany

[22] Filed: Nov. 21, 1973

[21] Appl. No.: 418,049

[30] Foreign Application Priority Data
Nov. 22, 1972  Germany............................ 2257158

[52] U.S. Cl............................. 259/192; 74/665 GA
[51] Int. Cl................................................. B01f 7/08
[58] Field of Search ....... 74/665 G, 665 GA, 665 L, 74/665, 665 GB, 665 GC, 665 GD, 606; 259/6, 21, 40, 64, 104, 192; 425/192

[56] References Cited
UNITED STATES PATENTS
2,188,717  1/1940  Jones................................... 259/104
3,795,456  3/1974  Schafer................................ 259/192

Primary Examiner—Harvey C. Hornsby
Assistant Examiner—James A. Niegowski
Attorney, Agent, or Firm—Walter Becker

[57] ABSTRACT

A transmission for twin worm extruders, in which the worm reaction forces are by worm pinion shafts in the transmission housing conveyed to an axial bearing housing and in the form of pulling forces are returned from a group of axial bearings by spacer bolt means in the transmission housing and spacer plate means between the axial bearing housing and the transmission housing and between the transmission housing and the worm housing to the latter. Some of these spacer bolt means are located below the extensions of the worm shafts in the transmission housing and extend in a contact free manner through sleeves which surround the respective adjacent spacer bolt means in radially spaced relationship thereto and have journaled thereon intermediate gears one of which is through transmission steps drivingly connected to a drive motor. These intermediate gears which are of the same size mesh with each other and respectively are also drivingly connected to one but a different one of the worm pinion shafts.

2 Claims, 2 Drawing Figures

Fig.1

TRANSMISSION FOR TWIN WORM EXTRUDERS

The present invention relates to a transmission for twin worm extruders with two driven worms and with transfer of the worm reaction forces by the worm pinion shafts of the transmission to an axial bearing group and return of these forces as pulling forces from the axial bearing housing through a structural element in the transmission housing to the worm housing.

For returning the worm reaction forces in the form of pulling forces from the axial bearing housing to the worm housing, it is known to screw a particularly shaped or formed part between the worm housing and the axial bearing housing which shaft part has its outer connecting surfaces screwed onto corresponding connecting surfaces of the transmission housing, said shaft receiving on its inside the bearings for the two worm pinion shafts. When the particularly shaped or formed part is connected to the transmission housing, the two worm pinion shafts engage the pertaining intermediate gears of the transmission. An arrangement of this type has the drawback that the particularly shaped or formed part has structural disadvantages due to the necessary perforated design for mounting the worm pinion shaft bearings. Thus when transferring high pulling forces, the particularly shaped or formed part will bend open and thus nevertheless will transfer expansion or restraining stresses to the transmission housing. Further harmful results of this bending open action consist in that the gear mesh between the worm pinion shafts and the pertaining intermediate gears is harmfully affected with an inherent increased wear of the gears. Furthermore, as a drawback of the bending open action it is to be mentioned that in view of the no longer precise central transfer of the high worm reaction forces to the worm pinion shafts and from there to the shafts of the axial bearing group, all radial bearings are additionally subjected to stresses.

With regard to the overall arrangement of all transmission gears it is advantageous that the vertical web of the formed part between the two worm pinions has to be made rather wide in view of the transfer of the pulling forces therewith. Accordingly, for reasons of space there is necessary installation of an intermediate shaft with corresponding gears between the worm pinion shafts and the transmission shaft driving the same together.

It is, therefore, an object of the present invention so to design the connection between the connecting surfaces on the transmission, which are directed toward the worm housing, and the axial bearing housing, that any expansion or constricting stresses of the transmission housing during the transfer of the worm reaction forces from the axial bearing back to the worm housing will be safely avoided while simultaneously favorable installing conditions will be obtained for the intermediate gears of the transmission.

These and other objects and advantages of the invention will appear more clearly from the following specification in connection with the accompanying drawings, in which.

Figure 1:
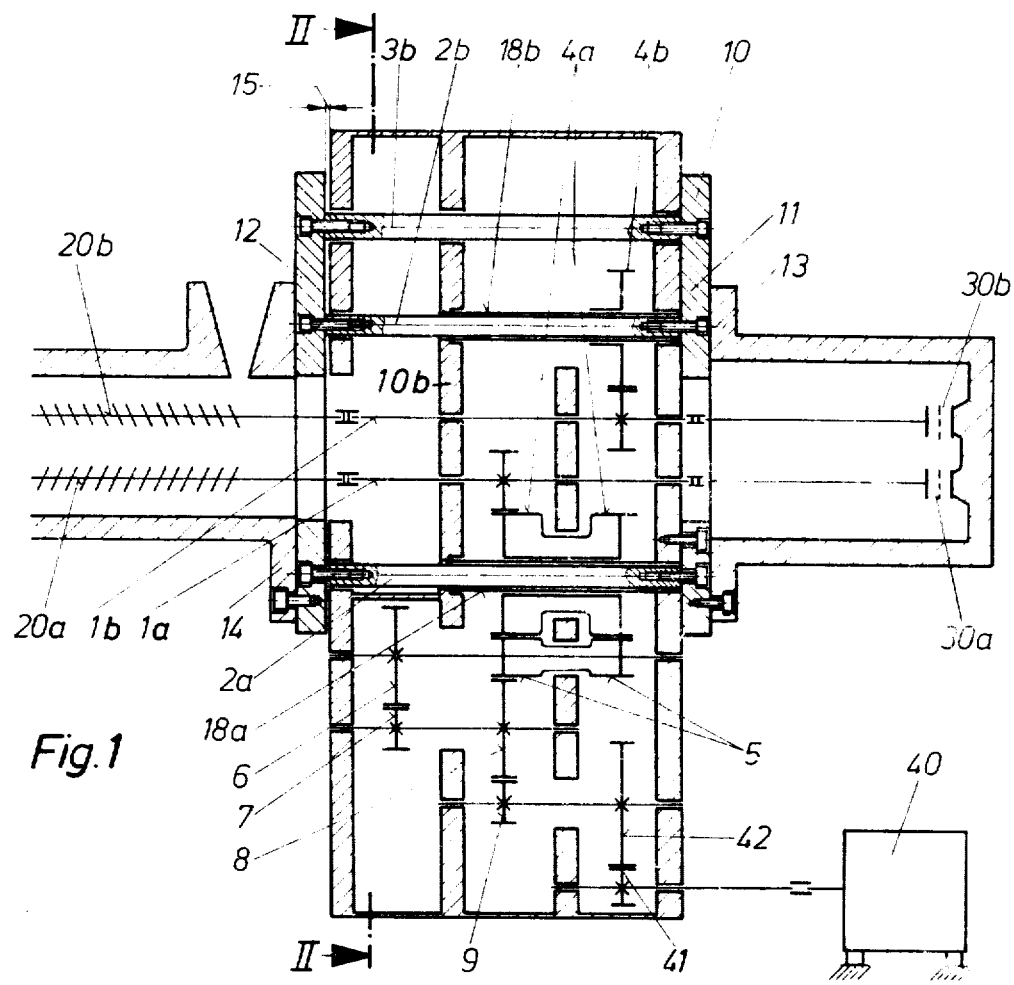
FIG. 1 represents a longitudinal section through the transmission according to the invention, said section being taken along the line I—I of FIG. 2.
Figure 2:
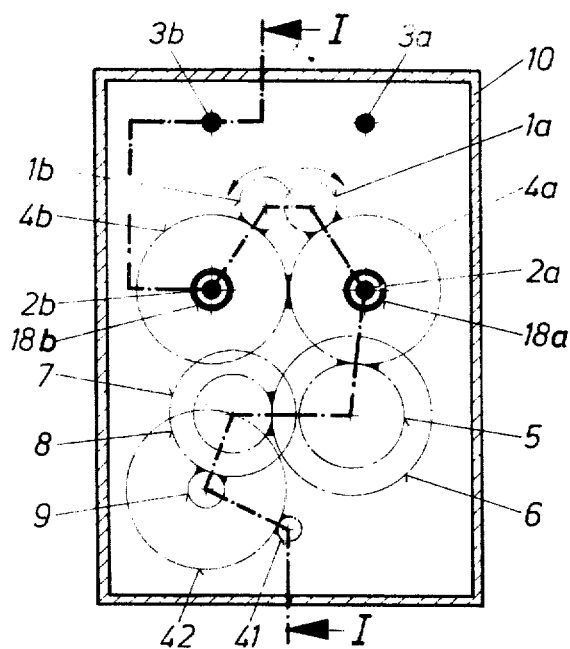
FIG. 2 shows an end view of the arrangement of the transmission shaft according to the section II—II of FIG. 1.

The transmission according to the invention for a twin worm extruder with two driven worms and the transfer of the worm reaction forces through worm pinion shafts in the transmission to an axial bearing group and return of these forces as pulling forces from the axial bearing housing through a structural member in the transmission housing to the worm housing is characterised primarily in that screwed to the end face of the transmission housing between two intermediate plates of which one is connected to the transmission housing as well as to the axial bearing housing whereas the other intermediate plate is arranged in slight spaced relationship to and ahead of the transmission housing wall and is connected only to the worm housing, there are four spacer bolts which extend to the transmission housing and are parallel and laterally offset above and below the worm axes while the two spacer bolts which are located below the worm axes are passed in a contact-free manner through sleeves located on both sides in the transmission housing. Intermediate gears of the same size are journaled on said sleeves and mesh with each other as well as respectively with one worm pinion shaft while one of said intermediate gears is through a plurality of gear stages connected to the driving motor.

Referring now to the drawing in detail, it will be seen that below the worm pinion shafts $1a$ and $1b$ there are provided two spacer bolts $2a$ and $2b$ which extend through the transmission housing 10. Arranged as an image to said bolts $2a$ and $2b$ are two further spacer bolts $3a$ and $3b$.

The spacer bolts $2a$, $2b$ and $3a$ and $3b$ have precisely the same length and are at the end faces connected to the intermediate plates 11 and 12.

The intermediate plate 11 is by means of screws connected to the transmission housing 10 and also to the axial bearing housing 13. The intermediate plate 12 is by means of screws connected to the worm housing 14. Between the intermediate plate 12 and the transmission housing 10 there is a slight gap 15. The gap 15 has to be only so wide that the intermediate plate 12 is safely prevented from engaging the transmission housing 10. With the abovementioned arrangement of the intermediate plates with the spacer bolts $2a$, $2b$ and $3a$ and $3b$ at the transmission housing 10, it will be assured that the reaction forces emanating from the worms $20a$ and $20b$ act axially through the worm pinion shafts $1a$ and $1b$ onto the axial bearings $30a$ and $30b$ and from here are through the axial bearing housing 13, the intermediate plate 11, the spacer bolts $2a$, $2b$ and $3a$ and $3b$, the intermediate plate 12 and the screws provided between the abovementioned parts transferred back in the form of pulling forces to the worm housing 14 without subjecting the transmission housing 10 in any way to stresses.

The intermediate gears $4a$ and $4b$ of the transmission which mesh with the worm pinion shafts $1a$ and $1b$ are rotatably mounted on sleeves $18a$ and $18b$ which in their turn are connected in the transmission housing 10 at both sides. The spacer bolts $2a$ and $2b$ are in contact-free manner passed through the sleeves $18a$ and $18b$ in order that these spacer bolts $2a$ and $2b$ which are subjected to pulling stresses will not additionally be subjected to radial forces from the intermediate gears $4a$ and $4b$ which are coaxially arranged to said bolts $2a$ and $2b$.

A radial support of the spacer bolts $2a$, $2b$ and $3a$ and $3b$ is effected in the bores of that wall of the transmission housing 10 which faces toward the worm housing 14 and in bores within the web 10b provided in the transmission housing 10.

The drive of the two worm pinion shafts 1a and 1b by the driving motor 40 will now be explained.

The driving motor 40 through gears 41, 42; 9, 8; 7,6 drives the twin gear 5 which is coaxially arranged with regard to the gear 6. Twin gear 5 meshes with the intermediate gear 4a which is likewise provided with two groups of teeth or two gears. By means of one of the groups of teeth, the intermediate gear 4a meshes with the worm pinion shaft 1a whereas by means of the other group of teeth the intermediate gear 4a meshes with the intermediate gear 4b of the same size. Gear 4b meshes with the worm pinion shaft 1b. By means of the above described gear arrangement, the two worm pinion shafts 1a and 1b are driven at absolutely the same speed but in opposite directions.

The primary advantages obtained by the transmission according to the present invention consists in that a return of the worm reaction forces from the axial bearing housing to the worm housing wil be realized without in any way affecting the transmission housing. Furthermore, by combining the centers of the lower spacer bolts with the centers of the intermediate gears which mesh with the worm pinion shaft, a simplified transmission design will be realized while saving two intermediate gears and the bearing therefor, over heretofore known transmissions in which the outer forces are transferred by webs extending into the transmission inner space.

It is, of course, to be understood that the present invention is, by no means, limited to the specific showing in the drawing but also comprises any modifications within the scope of the appended claims.

What I claim is:

1. In combination: a worm housing, first and second worm extruders arranged in said worm housing and extending substantially parallel to each other, a transmission housing, first and second shaft extensions respectively arranged in axial alignment with and drivingly connected to said first and second worm extruders, first intermediate plate means arranged at one side of said transmission housing and between said transmission housing and said worm housing while being connected to said worm housing and being slightly spaced from said transmission housing, second intermediate plate means arranged on the other side of said transmission housing which is opposite said one side of said transmission housing, said second intermediate plate means being connected to said other side of said transmission housing, axial bearing housing means connected to said second intermediate plate means, said first and second shaft extensions extending through said transmission housing into said axial bearing housing means, axial bearing means arranged in said axial bearing housing means and respectively rotatably supporting the adjacent ends of said shaft extensions in said axial bearing housing means, a first group of spacer bolt means located below said first and second shaft extending in said transmission housing and while extending through said transmission housing having its ends firmly connected to said first and second intermediate plate means, a second group of spacer bolt means located above said first and second shaft extensions in said transmission housing and while extending through the latter having its ends firmly connected to said first and second intermediate plate means respectively, first and second sleeve means respectively surrounding the spacer bolt means of said first group of spacer bolt means in a contact-free manner while each sleeve means of said first group of sleeve means had the ends thereof supported by said transmission housing, a pair of first gears having the same pitch circle diameter and the same number of teeth and respectively being journaled in said first and second sleeve means while meshing with each other and a pair of second gears having the pitch circle diameter and the same number of teeth and being respectively keyed to said first and second shaft extensions and respectively meshing with the gears of said pair of first gears, drive motor means and transmission gear means drivingly connected to said pair of first gears for driving the same, whereby said first and second worm extruders are rotatable by said motor means at the same speed but in opposite directions with regard to each other.

2. The combination of claim 1, in which the spacer bolt means of said first group of spacer bolt means are substantially parallel to and laterally offset with regard to said first and second shaft extensions.

* * * * *